US012671240B2

(12) United States Patent
Ye

(10) Patent No.: US 12,671,240 B2
(45) Date of Patent: Jun. 30, 2026

(54) POWER STRIP HAVING CABLE-WINDING STRUCTURE

(71) Applicant: DONGGUAN XINUO APOLLO ELECTRICAL TECHNOLOGY CO., LTD., Dongguan City (CN)

(72) Inventor: Senhua Ye, Dongguan City (CN)

(73) Assignee: DONGGUAN XINUO APOLLO ELECTRICAL TECHNOLOGY CO., LTD., Dongguan City (CN)

( * ) Notice: Subject to any disclaimer, the term of this patent is extended or adjusted under 35 U.S.C. 154(b) by 716 days.

(21) Appl. No.: 18/088,636

(22) Filed: Dec. 26, 2022

(65) Prior Publication Data

US 2024/0213752 A1    Jun. 27, 2024

(51) Int. Cl.
*H02G 11/02* (2006.01)
*H01R 31/02* (2006.01)
*H02G 11/00* (2006.01)

(52) U.S. Cl.
CPC ............. *H02G 11/02* (2013.01); *H01R 31/02* (2013.01); *H02G 11/00* (2013.01)

(58) Field of Classification Search
CPC .......... H02G 11/02; H02G 11/00; H02G 3/04; H02G 3/10; H01R 31/02; H01R 13/72; H01R 25/003
See application file for complete search history.

(56) References Cited

U.S. PATENT DOCUMENTS

| | | | | | |
|---|---|---|---|---|---|
| 5,071,367 | A | * | 12/1991 | Luu ......................... | H02G 11/02 |
| | | | | | 439/502 |
| 5,899,761 | A | * | 5/1999 | Crane .................... | H01R 25/00 |
| | | | | | 439/654 |
| 6,179,665 | B1 | * | 1/2001 | Rossman ............... | H02G 11/02 |
| | | | | | 439/654 |
| 6,756,543 | B1 | * | 6/2004 | Kaloustian ............. | H01R 13/72 |
| | | | | | 174/67 |
| 6,897,379 | B1 | * | 5/2005 | Hsiao ..................... | H01R 35/04 |
| | | | | | 174/53 |
| 9,225,128 | B2 | * | 12/2015 | Yap ....................... | H01R 25/003 |
| 10,581,209 | B2 | * | 3/2020 | Byrne .................... | H01R 13/72 |
| 2020/0067241 | A1 | * | 2/2020 | Jones ..................... | H01R 13/72 |

FOREIGN PATENT DOCUMENTS

| | | | | | | |
|---|---|---|---|---|---|---|
| CN | 106169680 | A | * | 11/2016 | .......... | H01R 13/717 |
| DE | 20203276 | U1 | * | 5/2002 | ............ | H01R 13/72 |
| DE | 102009010326 | A1 | * | 8/2010 | ........ | B65H 75/4473 |
| EP | 2081263 | A1 | * | 7/2009 | ............ | H01R 13/72 |
| MY | 137394 | A | * | 1/2009 | ............ | H01R 13/60 |

* cited by examiner

*Primary Examiner* — Cheng Lin
(74) *Attorney, Agent, or Firm* — Leong C. Lei

(57) ABSTRACT

A power strip having a cable-winding structure includes a power strip body and a cable. The power strip body includes a casing. The casing has a casing panel portion and a casing bottom portion that are disposed on opposite sides of the casing. The casing panel portion has electrical outlets thereon. The cable has a plug on an outer end thereof. The casing bottom portion has a first cable take-up block, a second cable take-up block spaced apart from the first cable take-up block, and a non-electrical outlet for the plug to be plugged and positioned in the non-electrical outlet. The cable can be wound around cable-winding portions of the first cable take-up block and the second cable take-up block.

13 Claims, 14 Drawing Sheets

20

10

POWER STRIP HAVING CABLE-WINDING STRUCTURE

BACKGROUND OF THE INVENTION

1. Field of the Invention

The present invention relates to a power strip, and more particularly to a power strip having a cable-winding structure.

2. Description of the Prior Art

In general, a power strip doesn't have a cable-winding structure. If it is necessary to wind the cable, the cable is usually wound around the power strip body. In this way, because the plug of the cable cannot be positioned, the wound cable is easy to loosen. Besides, the outer surface of the power strip body with the wound cable is an irregular curved surface. When the power strip is to be placed, it can't be positioned well. Chinese Utility Model Publication No. CN 203481558 U discloses a portable power strip. The power strip has a cable take-up device for winding a power cable, so that the power cable can be stored in the main body of the power strip conveniently and quickly. However, the thickness of the power strip is increased greatly, and the structure is more complicated. For common power strips, it is necessary to change the design of the structure of the power strip for the cable take-up structure. It is not easy to produce this power strip, and the production cost is high. This power strip is not widely used.

SUMMARY OF THE INVENTION

In view of the deficiencies of the prior art, the primary object of the present invention is to provide a power strip having a cable-winding structure. The cable of the power strip can be wound around the bottom of the power strip, and the plug of the cable can be plugged in a non-electrical outlet after the cable is wound up. The power strip is very compact. The structural design is simple and ingenious. The design space of the original power strip won't be occupied. Based on the basic design of the original power strip, a slight structural change is done. It is easy to produce the power strip.

In order to achieve the above object, the present invention adopts the following technical solutions:

A power strip having a cable-winding structure comprises a power strip body and a cable connected to the power strip body. The power strip body includes a casing. The casing has a casing panel portion and a casing bottom portion that are disposed on opposite sides of the casing. The casing panel portion has electrical outlets thereon. The cable extends out from one end of the casing. The cable has a plug on an outer end thereof.

The casing bottom portion has a first cable take-up block, a second cable take-up block spaced apart from the first cable take-up block, and a non-electrical outlet for the plug to be plugged and positioned in the non-electrical outlet. The non-electrical outlet is located between the first cable take-up block and the second cable take-up block. The first cable take-up block and the second cable take-up block each have one end that is pivotally connected to the casing bottom portion and another end that is rotatable to be unfolded and folded relative to the casing bottom portion. In a folded state, the first cable take-up block and the second cable take-up block are attached to the casing bottom portion, respectively.

When the first cable take-up block and the second cable take-up block are turned downward, the first cable take-up block and the second cable take-up block are unfolded to be below the casing bottom portion, opposite sides of the first cable take-up block and the second cable take-up block serve as cable-winding portions, so that the cable can be wound around the cable-winding portions of the first cable take-up block and the second cable take-up block, and the plug is plugged in the non-electrical outlet after the cable is wound up.

Compared with the prior art, the present invention has obvious advantages and beneficial effects. Specifically, it can be seen from the above technical solutions that the cable of the power strip can be wound around the bottom of the power strip, and the plug of the cable can be plugged in the non-electrical outlet after the cable is wound up. The power strip is very compact. The structural design is simple and ingenious, not occupying the design space of the original power strip. Based on the basic design of the original power strip, only the cable take-up blocks are provided, slightly changing the structure. It is easy to produce the power strip. The folding and unfolding operations of the cable take-up blocks are simple and easy. The power strip has strong practicability and can be widely used.

DETAILED DESCRIPTION OF THE PREFERRED EMBODIMENTS

Figure 1:
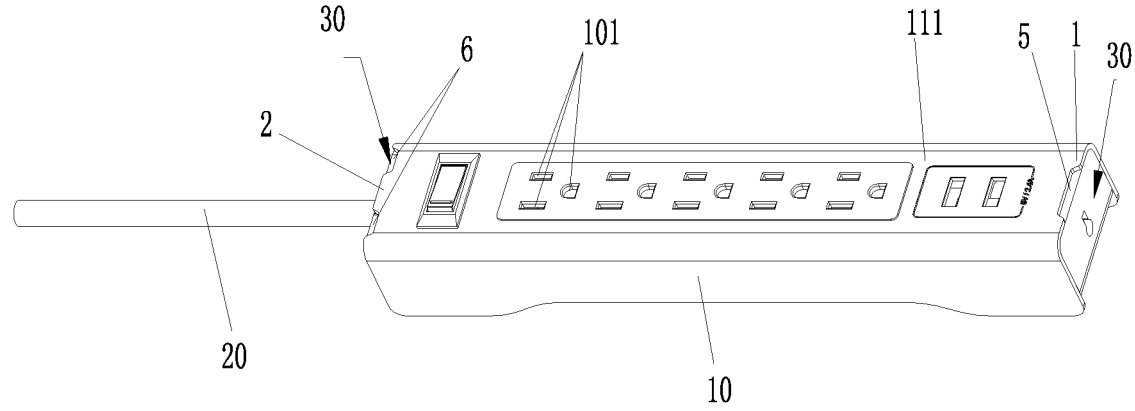
FIG. 1 is a perspective view according to a first embodiment of the present invention, wherein the cable is not wound.
Figure 2:
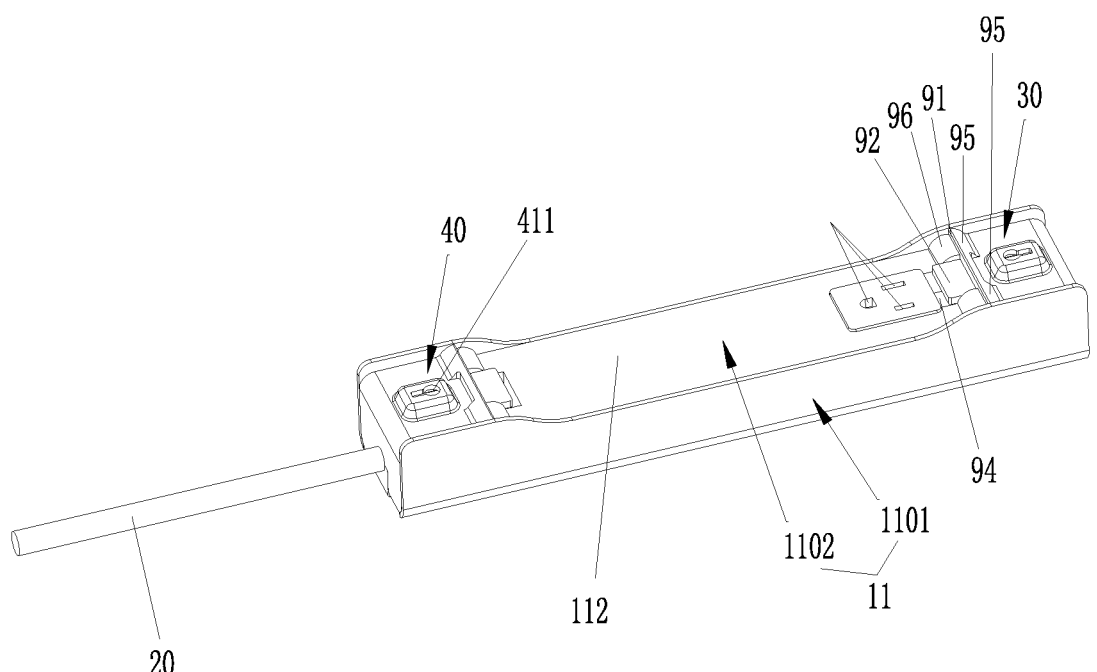
FIG. 2 is another perspective view according to the first embodiment of the present invention, wherein the cable is not wound.
Figure 3:
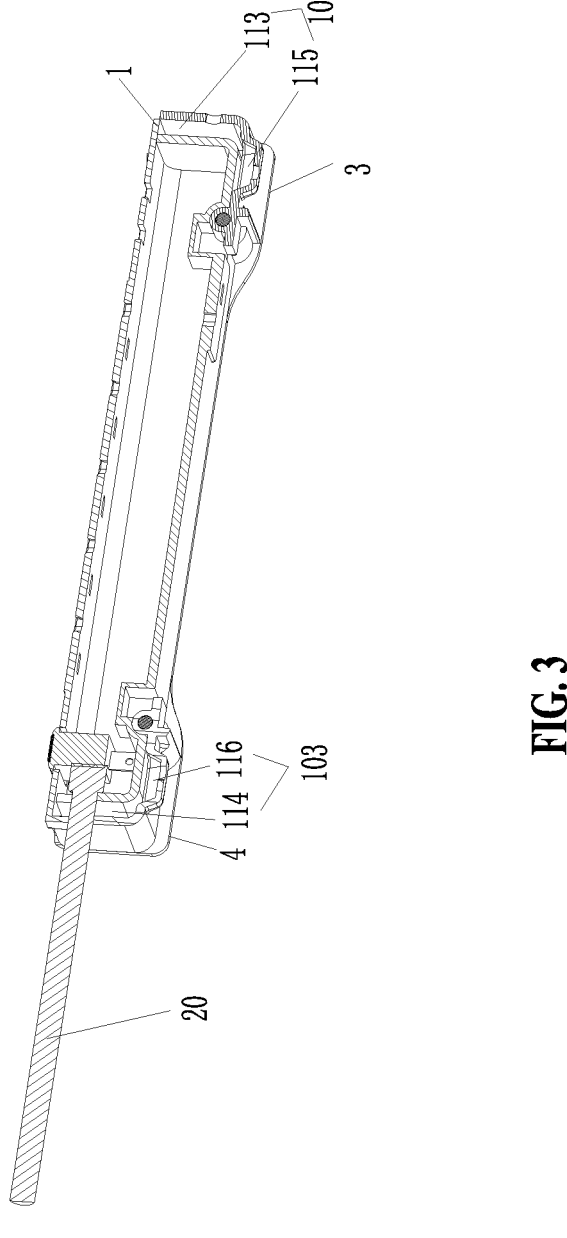
FIG. 3 is a cross-sectional view according to the first embodiment of the present invention, wherein the cable is not wound.
Figure 4:
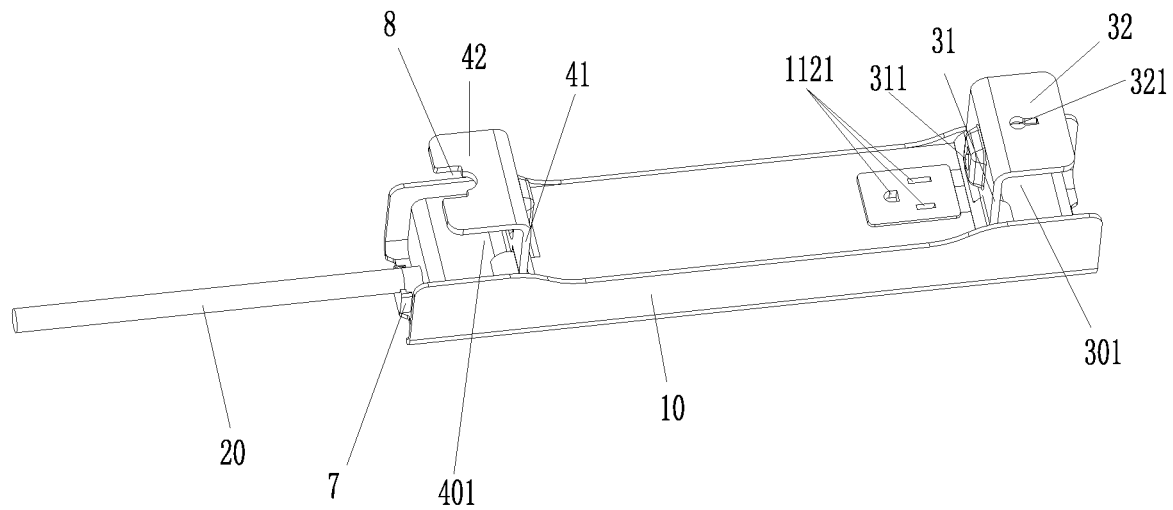
FIG. 4 is a perspective view according to the first embodiment of the present invention, wherein the cable is not wound, and the first cable take-up block and the second cable take-up block are unfolded.
Figure 5:
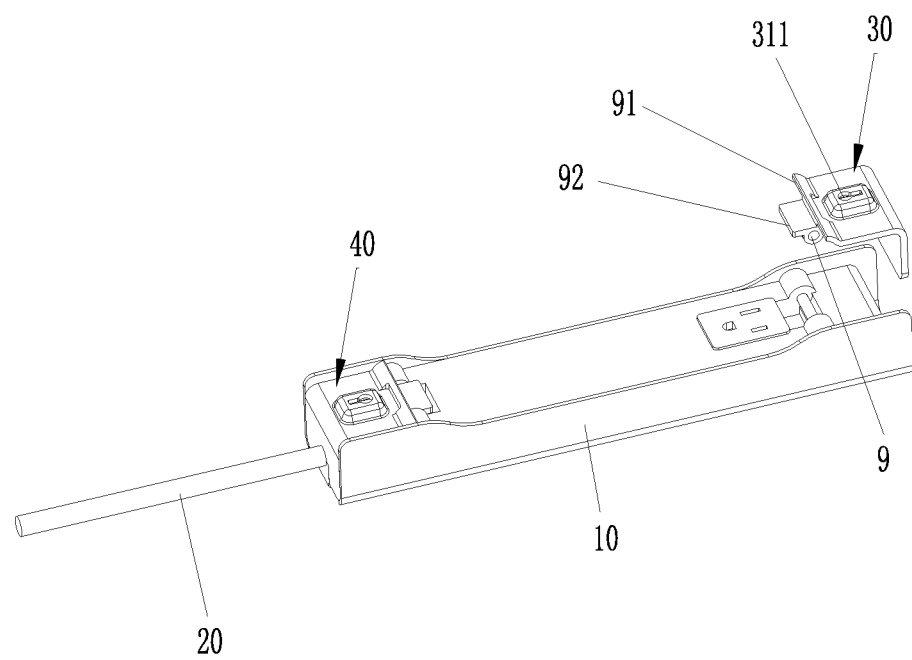
FIG. 5 is an exploded view according to the first embodiment of the present invention, wherein the cable is not wound.
Figure 6:
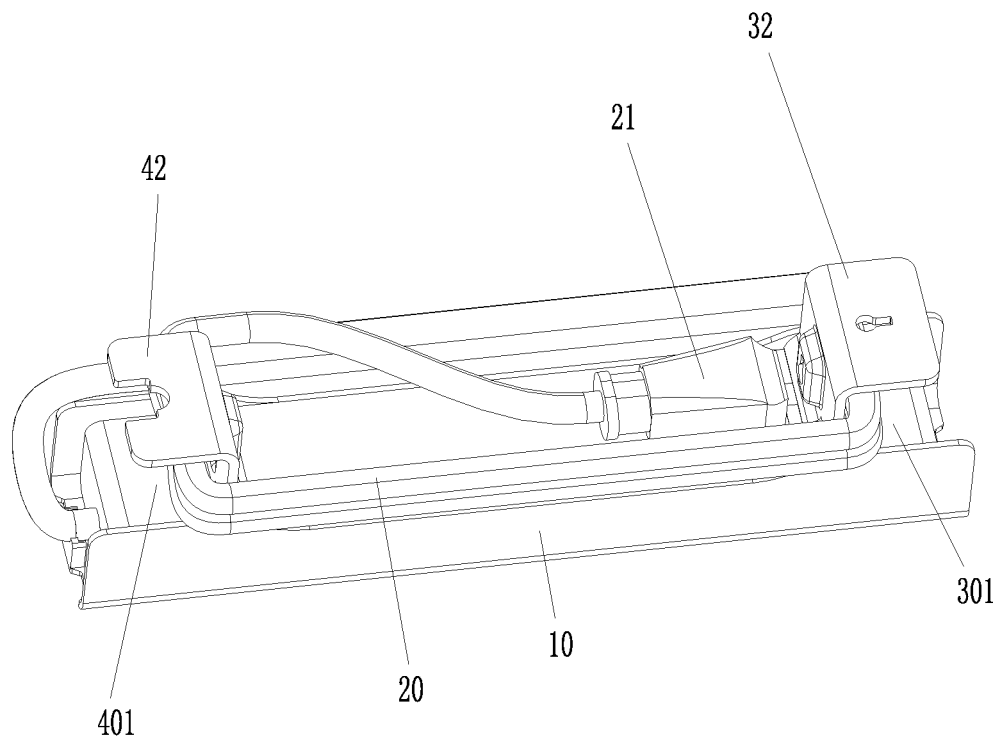
FIG. 6 is a perspective view according to the first embodiment of the present invention, wherein the cable is wound.
Figure 7:
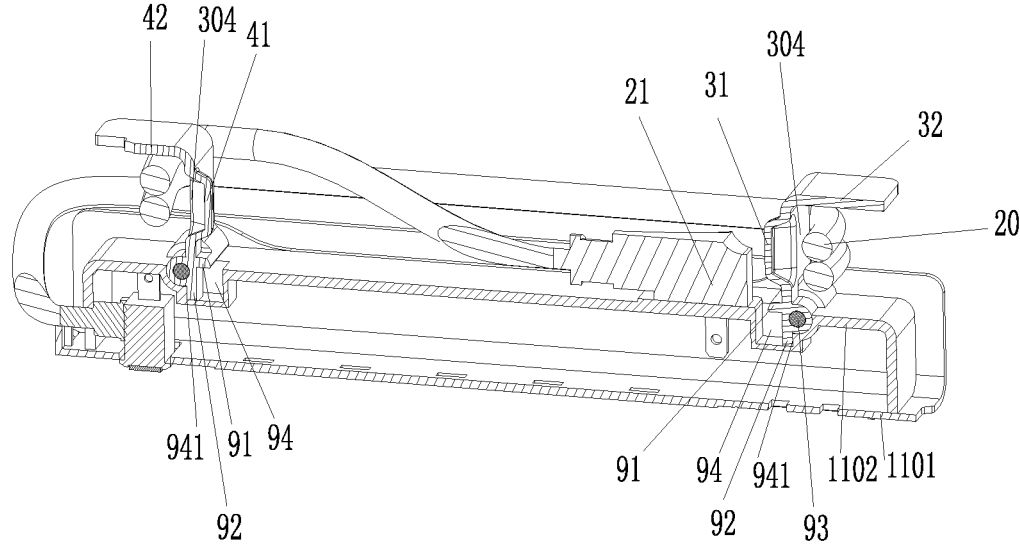
FIG. 7 is a cross-sectional view according to the first embodiment of the present invention, wherein the cable is wound.
Figure 8:
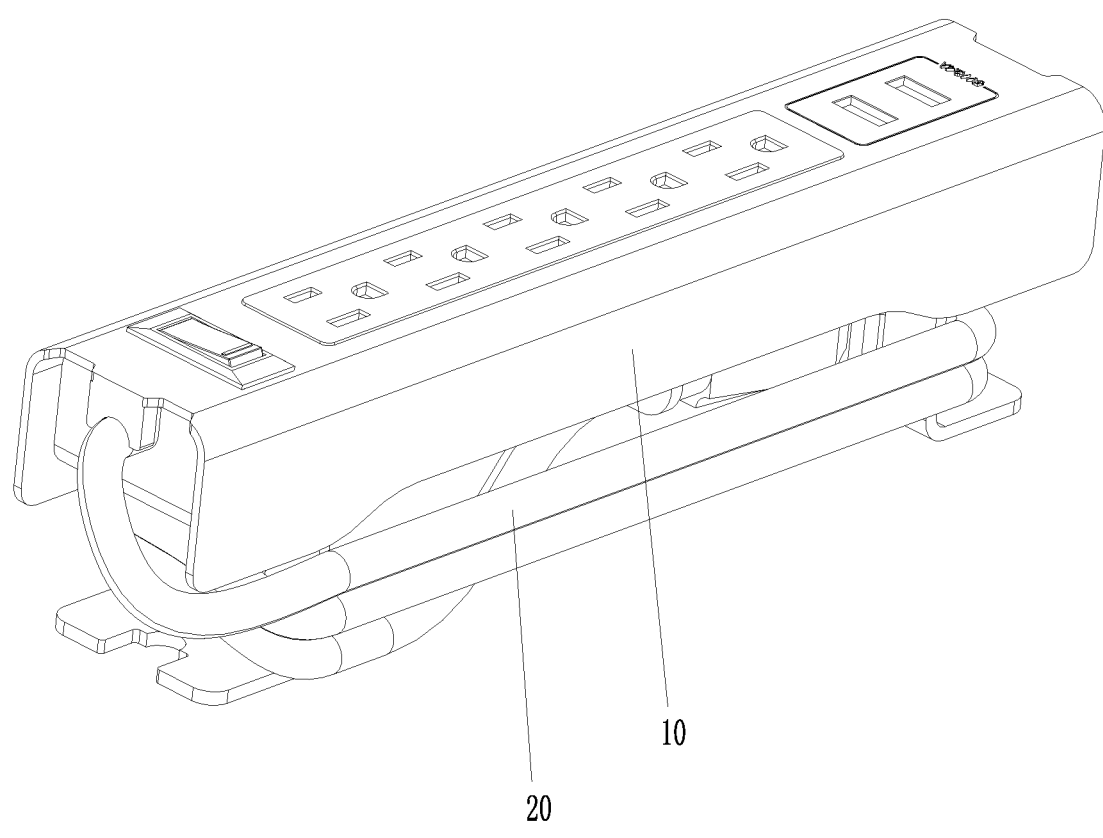
FIG. 8 is another perspective view according to the first embodiment of the present invention, wherein the cable is wound.
Figure 9:
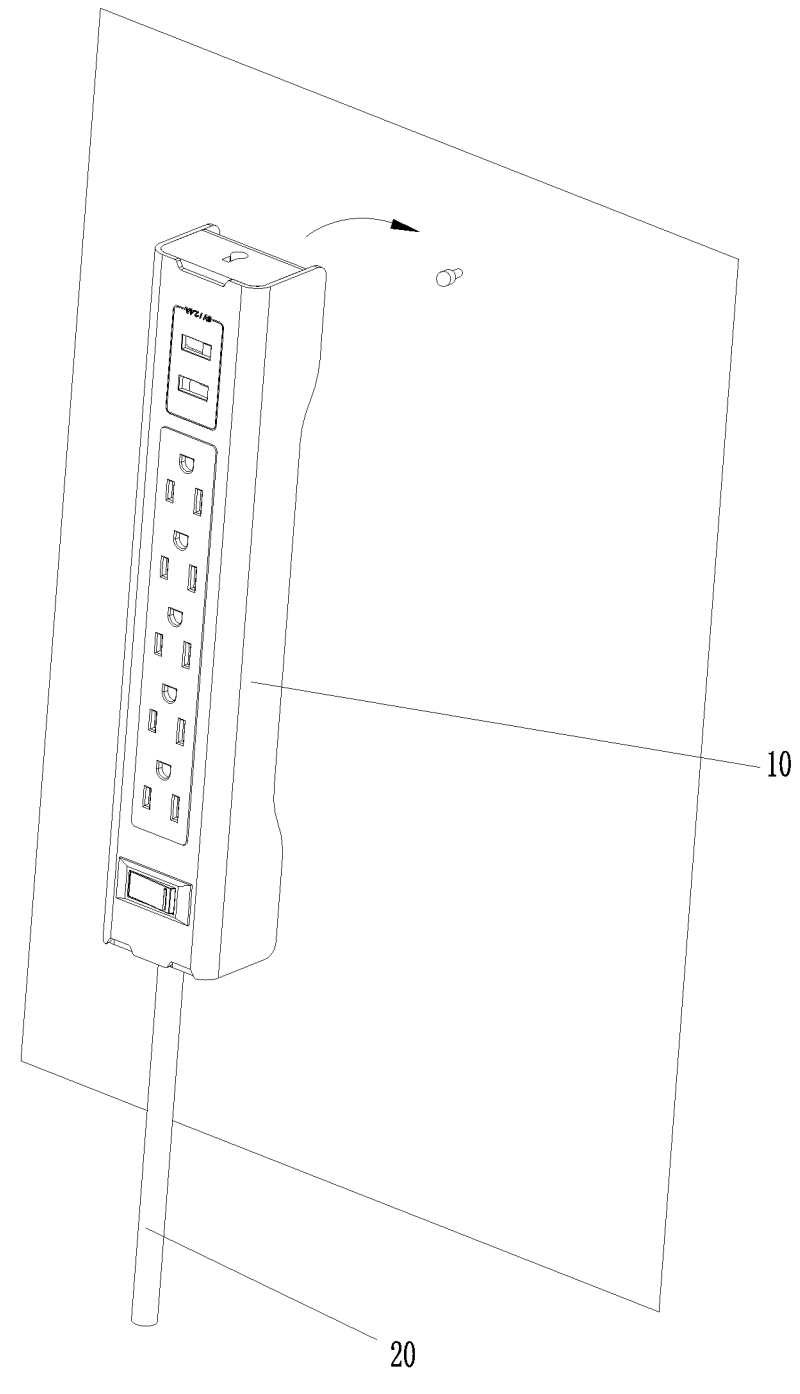
FIG. 9 is a schematic view according to the first embodiment of the present invention hung on a wall, wherein the cable is not wound.
Figure 10:
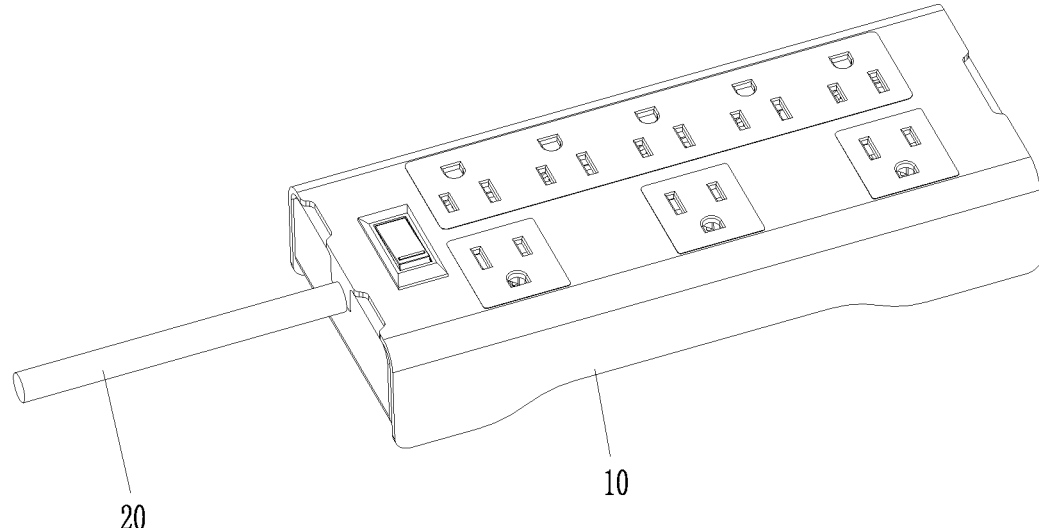
FIG. 10 is a perspective view according to a second embodiment of the present invention, wherein the cable is not wound.
Figure 11:
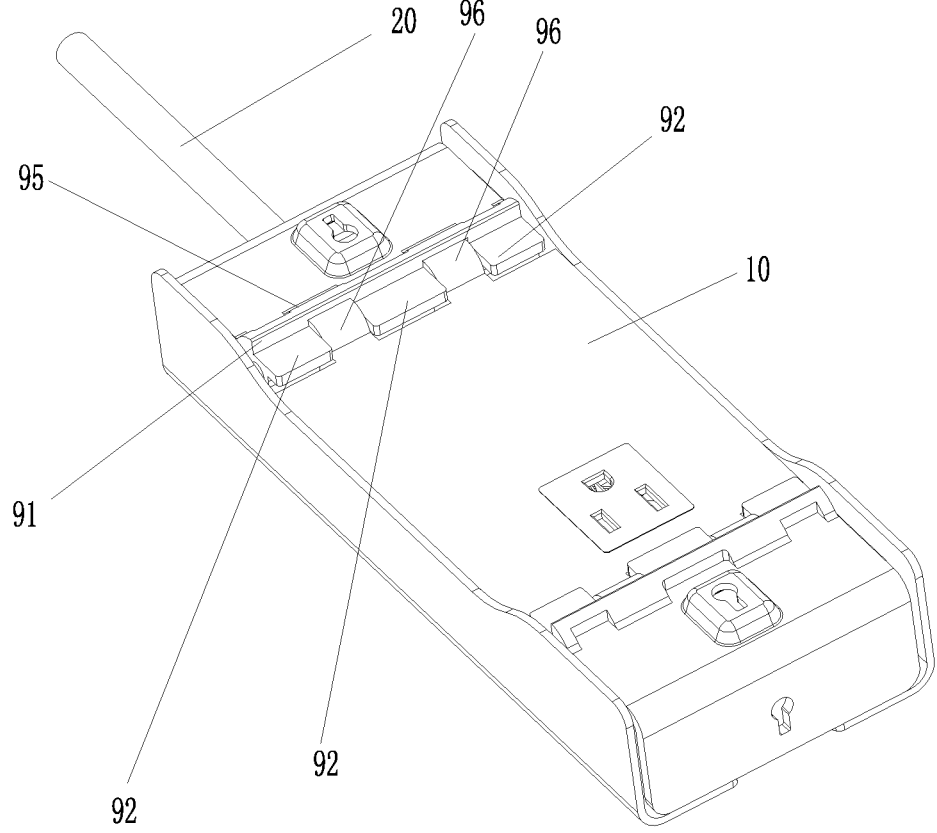
FIG. 11 is another perspective view according to the second embodiment of the present invention, wherein the cable is not wound.
Figure 12:
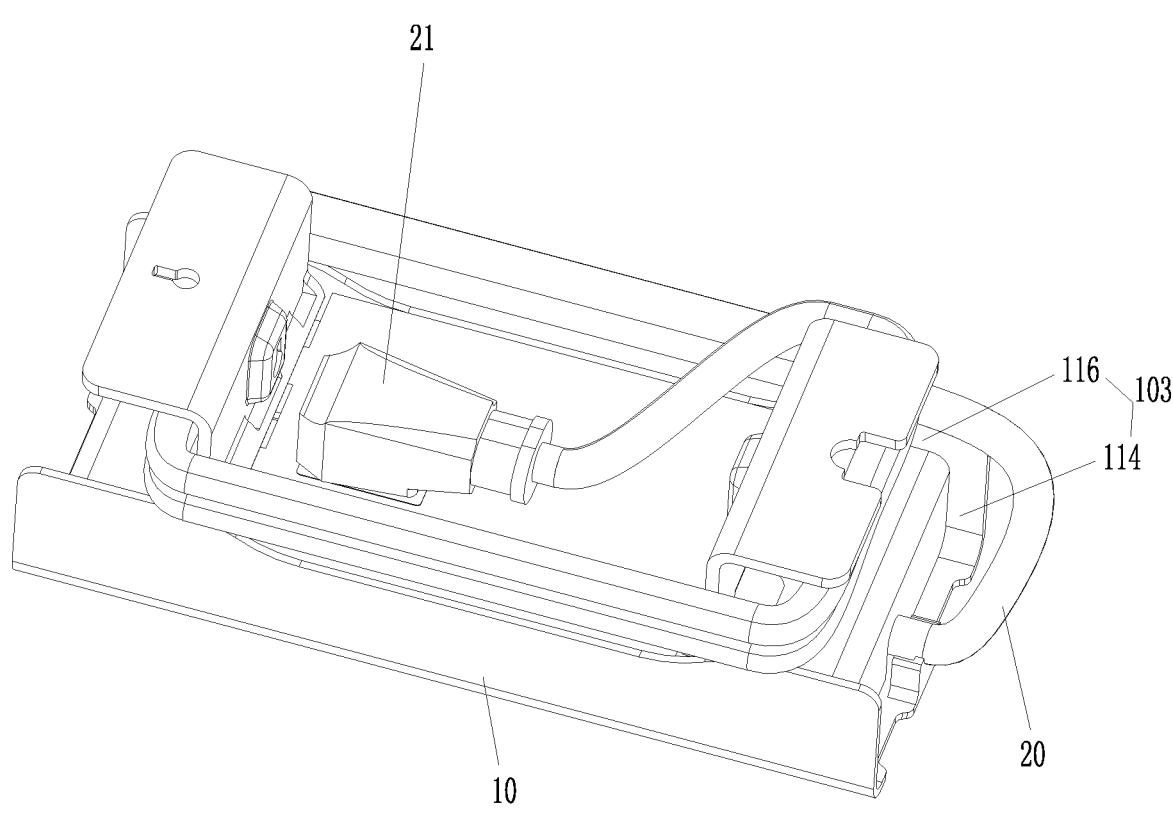
FIG. 12 is a perspective view according to the second embodiment of the present invention, wherein the cable is wound.
Figure 13:
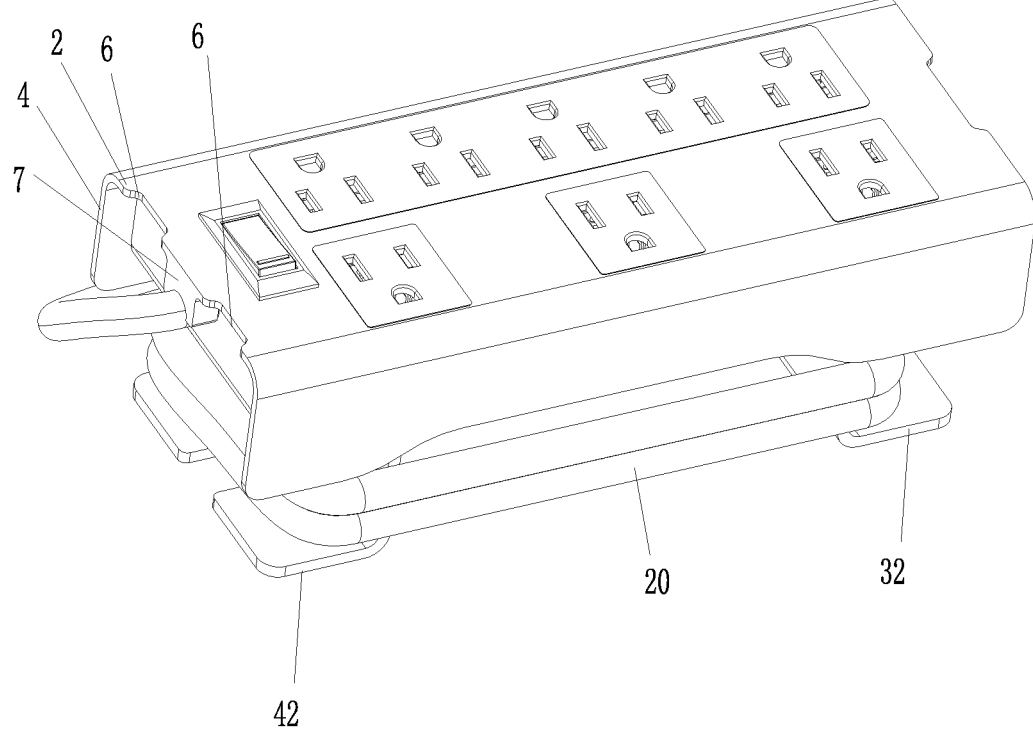
FIG. 13 is another perspective view according to the second embodiment of the present invention, wherein the cable is wound.
Figure 14:
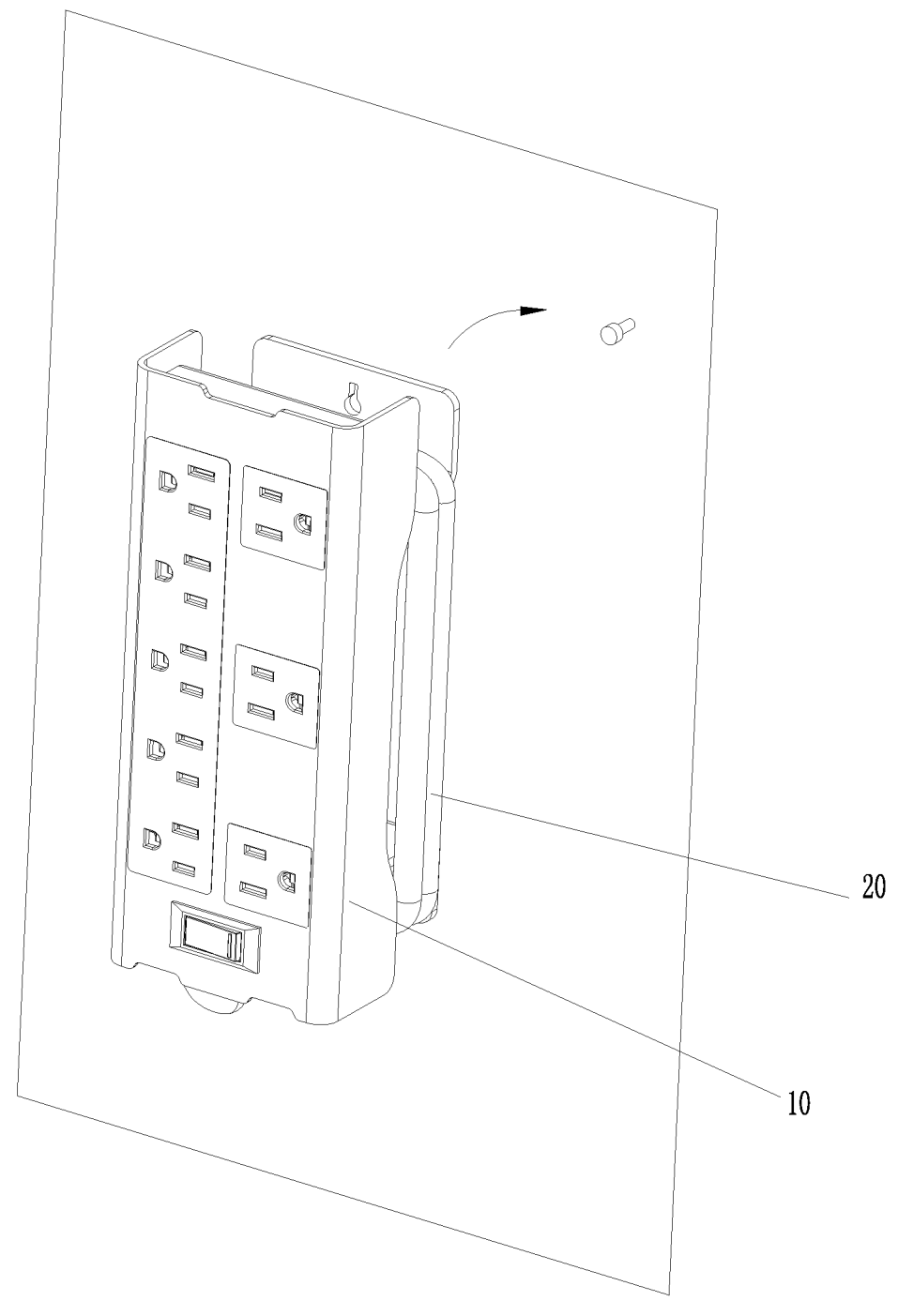
FIG. 14 is a schematic view according to the second embodiment of the present invention hung on a wall, wherein the cable is wound.

A power strip having a cable-winding structure comprises a power strip body 10 and a cable 20 connected to the power strip body 10.

The power strip body 10 includes a casing 11. The casing 11 has a casing panel portion 111 and a casing bottom portion 112 that are disposed on opposite sides of the casing 11. The casing panel portion 111 has electrical outlets 101 thereon. The inside of the power strip body 10 has conductive terminals corresponding to the electrical outlets 101. The conductive terminals are electrically connected to the cable 20.

The casing bottom portion 112 has a first cable take-up block 30, a second cable take-up block 40 spaced apart from the first cable take-up block 30, and a non-electrical outlet 1121 for a plug 21 to be plugged in the non-electrical outlet 1121. The non-electrical outlet 1121 is located between the first cable take-up block 30 and the second cable take-up block 40. The first cable take-up block 30 and the second cable take-up block 40 each have one end that is pivotally connected to the casing bottom portion 112 and another end that is rotatable to be unfolded and folded relative to the casing bottom portion 112. In a folded state, the first cable take-up block 30 and the second cable take-up block 40 are attached to the casing bottom portion 112, respectively. When the first cable take-up block 30 and the second cable take-up block 40 are turned downward, the first cable take-up block 30 and the second cable take-up block 40 are unfolded to be below the casing bottom portion 112. The opposite sides of the first cable take-up block 30 and the second cable take-up block 40 serve as cable-winding portions 304, so that the cable 20 can be wound around the cable-winding portions 304 of the first cable take-up block 30 and the second cable take-up block 40, and the plug 21 is plugged in the non-electrical outlet 1121 after the cable 20 is wound up.

The cable 20 extends out from one end of the casing 11. The cable 20 has a plug 21 on an outer end thereof. The cable 20 extends out from the rear end of the casing 111. The first cable take-up block 30 and the second cable take-up block 40 are spaced apart in a front-to-rear direction. The opposite sides of the first cable take-up block 30 and the second cable take-up block 40 are spaced apart in the front-to-rear direction.

The first cable take-up block 30 includes a first cable-winding portion 31 and a first cable-blocking portion 32. One end of the first cable-winding portion 31 is pivotally connected to the casing bottom portion 112. The other end of the first cable-winding portion 31 is connected to one end of the first cable-blocking portion 32. The other end of the first cable-blocking portion 32 extends away from the second cable take-up block 40. A first cable accommodating space 301 is defined between the first cable-blocking portion 31 and the first cable-winding portion 32. The first cable-winding portion 31 and the first cable-blocking portion 32 form a first L-shaped structure. The angle between the first cable-winding portion 31 and the first cable-blocking portion 32 is 80-100 degrees, preferably 90 degrees. The cable-winding portion 304 of the first cable take-up block 30 is disposed on the side of the first cable-winding portion 31, attachable to the casing bottom portion 112.

The second cable take-up block 40 includes a second cable-winding portion 41 and a second cable-blocking portion 42. One end of the second cable-winding portion 41 is pivotally connected to the casing bottom portion 112. The other end of the second cable-winding portion 41 is connected to one end of the second cable-blocking portion 42. The other end of the second cable-blocking portion 42 extends away from the first cable take-up block 30. A second cable accommodating space 401 is defined between the second cable-blocking portion 41 and the second cable-winding portion 42. The second cable-winding portion 41 and the second cable-blocking portion 42 form a second L-shaped structure. The angle between the second cable-winding portion 41 and the second cable-blocking portion 42 is 80-100 degrees, preferably 90 degrees. The cable-winding portion 304 of the second cable take-up block 40 is disposed on the side of the second cable-winding portion 41, attachable to the casing bottom portion 112.

The cable 20 passes through first cable accommodating space 301 and the second cable accommodating space 401 in sequence to be wound. The plug 21 is plugged in the non-electrical outlet 1121 after the cable 20 is wound up.

Considering the need for hanging use or storage, a first hanging hole 311 is disposed on the side of the first cable-winding portion 31, away from the casing bottom portion 112. A second hanging hole 411 is disposed on the side of the second cable-winding portion 41, away from the casing bottom portion 112. A third hanging hole 321 is disposed on the first cable-blocking portion 32. The hanging direction of the third hanging hole 312 is perpendicular to the hanging direction of the first hanging hole 311.

The front end of the casing 11 has a first receiving groove 113. The rear end of the casing 11 has a second receiving groove 114. The first cable-blocking portion 32 is folded in the first receiving groove 113. The second cable-blocking portion 42 is folded in the second receiving groove 114. In this embodiment, the casing 11 includes a face casing 1101 and a bottom casing 1102. The casing panel portion 111 is formed on the top of the face casing 1101. The casing bottom portion 112 is formed on the bottom of the bottom casing 1102. The front end of the top of the face casing 1101 has a front extension portion 1 extending forward beyond the front end of the bottom casing 1102. The first receiving groove 113 is defined between the front extension portion 1 and the front end face of the bottom casing 1102. The rear end of the top of the face casing 1101 has a rear extension portion 2 extending rearward beyond the rear end of the bottom casing 1102. The second receiving groove 114 is defined between the rear extension portion 2 and the rear end face of the bottom casing 1102. The left and right sides of the top of the face casing 1101, close to the front end, extend downward to form first lateral extension portions 3. A third receiving groove 115 is defined between the first lateral extension portions 3 and the casing bottom portion 112. The first cable-winding portion 31 is folded in the third receiving groove 115. The first receiving groove 113 communicates with the third receiving groove 115 to form a first L-shaped groove 102. The left and right sides of the top of the face casing 1101, close to the rear end, extend downward to form second lateral extension portions 4. A fourth receiving groove 116 is defined between the second lateral extension portions 4 and the casing bottom portion 112. The second cable-winding portion 41 is folded in the fourth receiving groove 116. The second receiving groove 114 communicates with the fourth receiving groove 116 to form a second L-shaped groove 103.

Further, the front extension portion 1 has a first operation notch 5 for unfolding the first cable take-up block 30. In the folded state, the first cable-blocking portion 32 is exposed at the first operation notch 5. The first cable take-up block 30 can be turned downward to be unfolded by pressing the exposed portion. The first operation notch 5 is arranged centrally. The rear extension portion 2 has second operation notches 6 for unfolding the second cable take-up block 40. The second operation notches 6 are disposed at the left and right sides of the cable 20, respectively. The bottom of the rear extension portion 2 has a raised portion 7. The raised portion 7 has a positioning groove. The cable 20 extends out from the rear end of the casing 11 and passes through the positioning groove, so that the cable 20 is positioned by means of the raised portion 7, so as to prevent the cable 20 from being damaged due to excessive bending. The second cable-blocking portion 41 has a notch 8 to give way to the cable 20. In the folded state, the second cable-blocking portion 42 is exposed at the second operation notch 6. The second cable take-up block 40 can be turned downward to be unfolded by pressing the exposed portion.

The structural design that the first cable take-up block 30 and the second cable take-up block 40 are pivotally connected to the casing bottom portion 112 is relatively ingenious.

Specifically, the one end of each of the first cable-winding portion 31 and the second cable-winding portion 41 has a shaft hole 9. The first cable-winding portion 31 and the second cable-winding portion 41 each have a first stopper 91 and a second stopper 92 at two sides of the shaft hole 9. The casing bottom portion 112 has a shaft 93 and a recess 94. The shaft 93 passes through the shaft hole 9. The recess 94 is recessed upward from the casing bottom portion 112. In the unfolded state, the first stopper 91 is against the casing bottom portion 112, and the second stopper 92 is against an inner end surface 941 of the recess 94. The first cable-winding portion 31 and the second cable-winding portion 41 each have guide curved portions 95 corresponding to the left and right sides of the shaft hole 9. The first stopper 91 is disposed on the ends of the guide curved portions 95. The casing bottom portion 112 has convex arc portions 96 coaxially arranged with the shaft 93. When the first cable take-up block 30 and the second cable take-up block 40 are turned, the guide curved portions 95 slide along the corresponding convex arc portions 96. Because the convex arc portions 96 are located at the left and right sides of the shaft hole 9 respectively, the force balance is better, and the turning operation is smoother. Besides, the ends of the left and right convex arc portions 93 are flush, forming an integrated structure, which is easy to manufacture and has better structural strength.

What is claimed is:

1. A power strip having a cable-winding structure, comprising a power strip body and a cable connected to the power strip body, the power strip body including a casing, the casing having a casing panel portion and a casing bottom portion that are disposed on opposite sides of the casing, the casing panel portion having electrical outlets thereon, the cable extending out from one end of the casing, the cable having a plug on an outer end thereof;

the casing bottom portion having a first cable take-up block, a second cable take-up block spaced apart from the first cable take-up block and a non- electrical outlet for the plug to be plugged and positioned in the non-electrical outlet, the non-electrical outlet being located between the first cable take-up block and the second cable take-up block, the first cable take-up block and the second cable take-up block each having one end that is pivotally connected to the casing bottom portion and another end that is rotatable to be unfolded and folded relative to the casing bottom portion, in a folded state, the first cable take-up block and the second cable take-up block being attached to the casing bottom portion respectively, wherein when the first cable take-up block and the second cable take-up block are turned downward, the first cable take-up block and the second cable take-up block are unfolded to be below the casing bottom portion, opposite sides of the first cable take-up block and the second cable take-up block serve as cable-winding portions, so that the cable can be wound around the cable-winding portions of the first cable take-up block and the second cable take-up block, and the plug is plugged in the non-electrical outlet after the cable is wound up.

2. The power strip as claimed in claim 1, wherein the first cable take-up block includes a first cable-winding portion and a first cable-blocking portion, one end of the first cable-winding portion is pivotally connected to the casing bottom portion, another end of the first cable-winding portion is connected to one end of the first cable-blocking portion, another end of the first cable-blocking portion extends away from the second cable take-up block, a first cable accommodating space is defined between the first cable-blocking portion and the first cable-winding portion; the cable-winding portion of the first cable take-up block is disposed on one side of the first cable-winding portion, attachable to the casing bottom portion;

the second cable take-up block includes a second cable-winding portion and a second cable-blocking portion, one end of the second cable-winding portion is pivotally connected to the casing bottom portion, another end of the second cable-winding portion is connected to one end of the second cable-blocking portion, another end of the second cable-blocking portion extends away from the first cable take-up block, a second cable accommodating space is defined between the second cable-blocking portion and the second cable-winding portion; the cable-winding portion of the second cable take-up block is disposed on one side of the second cable-winding portion, attachable to the casing bottom portion;

the cable passes through first cable accommodating space and the second cable accommodating space in sequence to be wound.

3. The power strip as claimed in claim 2, wherein the first cable-winding portion and the first cable-blocking portion form a first L-shaped structure; the second cable-winding portion and the second cable-blocking portion form a second L-shaped structure.

4. The power strip as claimed in claim 3, wherein an angle between the first cable-winding portion and the first cable-blocking portion is 80-100 degrees; an angle between the second cable-winding portion and the second cable-blocking portion is 80-100 degrees.

5. The power strip as claimed in claim 2, wherein a first hanging hole is disposed on another side of the first cable-winding portion, away from the casing bottom portion.

6. The power strip as claimed in claim 2, wherein a second hanging hole is disposed on another side of the second cable-winding portion, away from the casing bottom portion.

7. The power strip as claimed in claim 2, wherein a third hanging hole is disposed on a first cable-blocking portion, and a hanging direction of the third hanging hole is perpendicular to a hanging direction of a first hanging hole.

8. The power strip as claimed in claim 2, wherein a front end of the casing has a first receiving groove, a rear end of the casing has a second receiving groove, the first cable-blocking portion is folded in the first receiving groove, and the second cable-blocking portion is folded in the second receiving groove.

9. The power strip as claimed in claim 8, wherein the casing includes a face casing and a bottom casing, the casing panel portion is formed on a top of the face casing, the casing bottom portion is formed on a bottom of the bottom casing;

a front end of the top of the face casing has a front extension portion extending forward beyond a front end of the bottom casing, the first receiving groove is defined between the front extension portion and a front end face of the bottom casing; a rear end of the top of the face casing has a rear extension portion extending rearward beyond a rear end of the bottom casing, the second receiving groove is defined between the rear extension portion and a rear end face of the bottom casing;

left and right sides of the top of the face casing, close to the front end, extend downward to form first lateral extension portions, a third receiving groove is defined between the first lateral extension portions and the casing bottom portion, the first cable-winding portion is folded in the third receiving groove; the first receiving groove communicates with the third receiving groove to form a first L-shaped groove;

the left and right sides of the top of the face casing, close to the rear end, extend downward to form second lateral extension portions, a fourth receiving groove is defined between the second lateral extension portions and the casing bottom portion, the second cable-winding portion is folded in the fourth receiving groove; the second receiving groove communicates with the fourth receiving groove to form a second L-shaped groove.

10. The power strip as claimed in claim 9, wherein the front extension portion has a first operation notch for unfolding the first cable take-up block, in the folded state, the first cable-blocking portion is exposed at the first operation notch; the rear extension portion has a second operation notch for unfolding the second cable take-up block, in the folded state, the second cable- blocking portion is exposed at the second operation notch.

11. The power strip as claimed in claim 2, wherein the one end of each of the first cable-winding portion and the second cable-winding portion has a shaft hole, the first cable-winding portion and the second cable-winding portion each have a first stopper and a second stopper at two sides of the shaft hole; the casing bottom portion has a shaft and a recess, the shaft passes through the shaft hole, the recess is recessed upward from the casing bottom portion; in an unfolded state, the first stopper is against the casing bottom portion, and the second stopper is against an inner end surface of the recess.

12. The power strip as claimed in claim 11, wherein the first cable-winding portion and the second cable-winding portion each have guide curved portions corresponding to left and right sides of the shaft hole, the first stopper is disposed on ends of the guide curved portions; the casing bottom portion has convex arc portions coaxially arranged with the shaft, when the first cable take-up block and the second cable take-up block are turned, the guide curved portions slide along the corresponding convex arc portions.

13. The power strip as claimed in claim 11, wherein the cable extends out from a rear end of the casing, the first cable take-up block and the second cable take-up block are spaced apart in a front-to-rear direction, and the opposite sides of the first cable take-up block and the second cable take-up block are spaced apart in the front-to-rear direction.

\* \* \* \* \*